United States Patent [19]

Potter

[11] Patent Number: 4,811,360

[45] Date of Patent: Mar. 7, 1989

[54] APPARATUS AND METHOD FOR ADAPTIVELY OPTIMIZING EQUALIZATION DELAY OF DATA COMMUNICATION EQUIPMENT

[75] Inventor: William J. Potter, Middlebury, Conn.

[73] Assignee: General DataComm, Inc., Middlebury, Conn.

[21] Appl. No.: 144,534

[22] Filed: Jan. 14, 1988

[51] Int. Cl.$^4$ .............................................. H03H 7/30
[52] U.S. Cl. ........................................ 375/11; 333/18; 364/724.2
[58] Field of Search ............... 375/11, 12, 13; 333/18, 333/28 R, 28 T; 364/724

[56] References Cited

U.S. PATENT DOCUMENTS

| | | | |
|---|---|---|---|
| 3,715,666 | 2/1973 | Mueller et al. | 375/13 |
| 4,006,352 | 2/1977 | Sato | 333/18 |
| 4,539,689 | 9/1985 | Chiu et al. | 375/13 |
| 4,571,733 | 2/1986 | Kaku et al. | 333/18 |
| 4,695,969 | 9/1987 | Sollenberger | 375/13 |

FOREIGN PATENT DOCUMENTS 2129257A 5/1984 United Kingdom ................... 375/13

Primary Examiner—Robert L. Griffin
Assistant Examiner—Stephen Chin
Attorney, Agent, or Firm—David P. Gordon

[57] ABSTRACT

A data communication equipment equalizer which minimizes the total training time delay (RTS-CTS) is disclosed. The total RTS-CTS delay of the provided equalizer consists of a delay due to a minimal training sequence required for the equalizer coefficients to converge given a low distortion channel, plus whatever delay is necessary for the equalizer coefficients to converge given the particular channel. The equalizer of the invention preferably comprises: first and second FIRs each having a plurality of taps for storing data signal samples over time, a plurality of tap gain for multiplying the equalizer coefficients with the stored data samples, a coefficient update for comparing the sum of the tap gain products to an ideal value and for changing equalizer coefficients accordingly, and a processor for processing the communications data according to the adapted equalizer coefficients; a buffer delay for receiving and storing the communications data transmitted after the completion of the training sequence and before the equalizer coefficients have been sufficiently adapted to allow substantially error free transmission; and a data decision for deciding what ideal data value to assign a processed data sample. While the training sequence length is minimized for an optimal channel, no communications data is lost in a non-optimal channel as the buffer delay stores the communications data while the FIRs use the communications data to continue to adapt the equalizer coefficients.

20 Claims, 3 Drawing Sheets

APPARATUS AND METHOD FOR ADAPTIVELY OPTIMIZING EQUALIZATION DELAY OF DATA COMMUNICATION EQUIPMENT

BACKGROUND

This invention relates to data communications equipment (e.g. modems) and is particularly useful in a multipoint arrangements in which a central station communicates with a number of remote stations sequentially.

It is well known in the art that in establishing communications between modems, a training sequence of fixed duration may be sent between the data communications equipment (modem) sending the information to the data communication equipment (modem) receiving the information prior to the sending of actual data. The training sequence is typically used to synchronize the timing between the modems and to permit the receiving modem to compensate for the amplitude and phase delay characteristics of the channel over which the data is to be sent. The amplitude and phase delay characteristics which create intersymbol interference are often corrected through the use of equalizers or adaptive equalizers located in the receiving modem. Examples of such equalizers and techniques relating to the same may be seen with reference to the following U.S. patents which are evidence of the state of the art: U.S. Pat. Nos. 4,606,044 to Kudo; 4,571,732 to Pirani et al.; 4,375,692 to Shensa et al.; 4,343,041 to Forney, Jr.; 4,100,495 to Luvison et al.; 4,061,978 to Motley et al.; 4,006,352 to Sato; 4,004,226 to Qureshi et al.; 3,978,407 to Forney, Jr. et al.; 3,715,666 to Mueller et al.; 3,660,761 to Harmon, Jr. et al.; and 3,479,458 to Lord, et al. Reference may also be had to Qureshi, Shahid "Adaptive Equalization", *IEEE Communications Magazine*, (March 1982, pp. 9–16), and Qureshi, Shahid "Adaptive Equalization", *Proceedings of the IEEE*, Vol. 73, No. 9 (September 1985 pp. 1349–1387).

As will be appreciated by those skilled in the art, the durations of training sequences have been fixed to permit modems to adapt to the worst case line scenarios. Because the accuracy of the equalization becomes more critical as the data rate of the modem increases, it is not uncommon to find training sequences (RTS-CTS delay) of between 0.25 to 1.5 seconds in length for modems operating at or greater than 9600 bits per seconds (bps). Of course, lengthy training times have been viewed unfavorably as they increase "overhead", and it has been a desire in the art to provide equalization techniques which can reduce the training time required.

SUMMARY OF THE INVENTION

It is therefore an object of the invention to provide a method and system for reducing the training time of a modem to a minimum regardless of the particular communication channel over which it is operating.

It is a further object of the invention to provide an adaptive equalizing system which permits data communication to begin after a minimal amount of time for channels of the highest quality and which adjusts the amount of time required before data communication begins for channels of other than the highest quality depending upon the particular quality of the channel.

In accord with the objects of the invention, a modem equalizer which is arranged to receive training sequence data followed by "communications" data (hereinafter used to indicate the real data which is intended to be communicated from one data terminal to another) is provided, where the equalizer detects and processes data which has been sent over and distorted by a channel. The modem equalizer preferably comprises:

(a) an impulse response means including
a plurality of tap means for storing data samples over time,
a plurality of tap gain means which multiply equalizer coefficients with the stored samples,
a summing means for accumulating the products of the plurality of tap gain means and producing an output therefrom, and
coefficient update means for comparing the output to an ideal value, for changing the equalizer coefficients accordingly, and for determining whether the equalizer coefficients are sufficiently adapted to allow substantially error free transmission;

(b) buffer delay means for receiving at least the communications data samples transmitted after the completion of a training sequence and before the equalizer coefficients of the impulse response means have been sufficiently adapted to allow substantially error free transmission, and for providing delayed data to an impulse response means which, after said equalizer coefficients are sufficiently adapted to allow substantially error free transmission, processes said data according to said adapted equalizer coefficients; and (c) data decision means for deciding what data value to assign a processed data sample.

With the provided equalizer, the total training time delay (RTS-CTS) of the system is minimized and consists of a delay due to a minimal training sequence based on a best case channel plus the particular delay necessary for the equalizer coefficients to sufficiently adapt to a particular channel. However, even though the training sequence length is minimized for the best case channel, no communications data is lost as the buffer means stores the communications data while the equalization means uses the communications data to continue to adapt its coefficients. Also, it is of note that the provided method for adjusting training time delay requires no communication between the data communication equipment.

Preferably, the impulse response means of the equalizer of the invention is a finite impulse response filter (FIR), and preferably, a second FIR is provided at the output of the buffer delay means to receive the communications data and to process the data with the coefficients determined by the equalization means of the first FIR. The data decision means of the equalizer of the invention may be placed at the output of the second FIR such that the determined signals may be sent to a desired data terminal equipment. With two FIRs, a double adjustment to the tap gain means per baud is possible. With a single FIR, switches are preferably provided to permit the data source to send communications directly to the buffer delay and to permit the buffer delay to send its information to the data taps once convergence is obtained, and to connect the output of the data decision means to the data terminal equipment. Regardless of the number of FIRs utilized, as will become clear hereinafter, the particular connections between the input to the buffer delay means with the data taps, and the output of the buffer delay means with the data taps may be arranged as desired. It will be seen that in one arrangement, the data taps of the FIR can act as part of the data delay buffer, although such an arrangement might add additional delay beyond the absolute minimum.

It will be appreciated that the method for adaptively optimizing equalization delay corresponds closely with the provided equalizer and preferably comprises:

(a) sending a training sequence signal of substantially minimal length over a channel to a receiving modem having an equalizer, wherein the training sequence signal length is substantially defined by the length of time required to permit the equalizer of a receiving modem to adapt its coefficients so as to allow substantially error free data transmission given a low distortion channel;

(b) sending communications data over said channel to the receiving modem;

(c) using at least the training sequence signal to adapt the equalizer coefficients;

(d) storing at least the received communications data in a buffer delay means while the equalizer coefficients are being adapted, wherein the received communications data is further used by the equalizer to adapt its coefficients;

(e) upon said equalizer coefficients being sufficiently adapted to allow substantially error free transmission, processing in an equalizer having said adapted coefficients the communications data stored in said buffer delay means; and (f) from said processed communications data, determining the values of said communications data sent over said channel.

A better understanding of the invention, and additional advantages and objects of the invention will become apparent to those skilled in the art upon reference to the detailed description and the accompanying drawings.

DETAILED DESCRIPTION OF THE PREFERRED EMBODIMENTS

Figure 1:
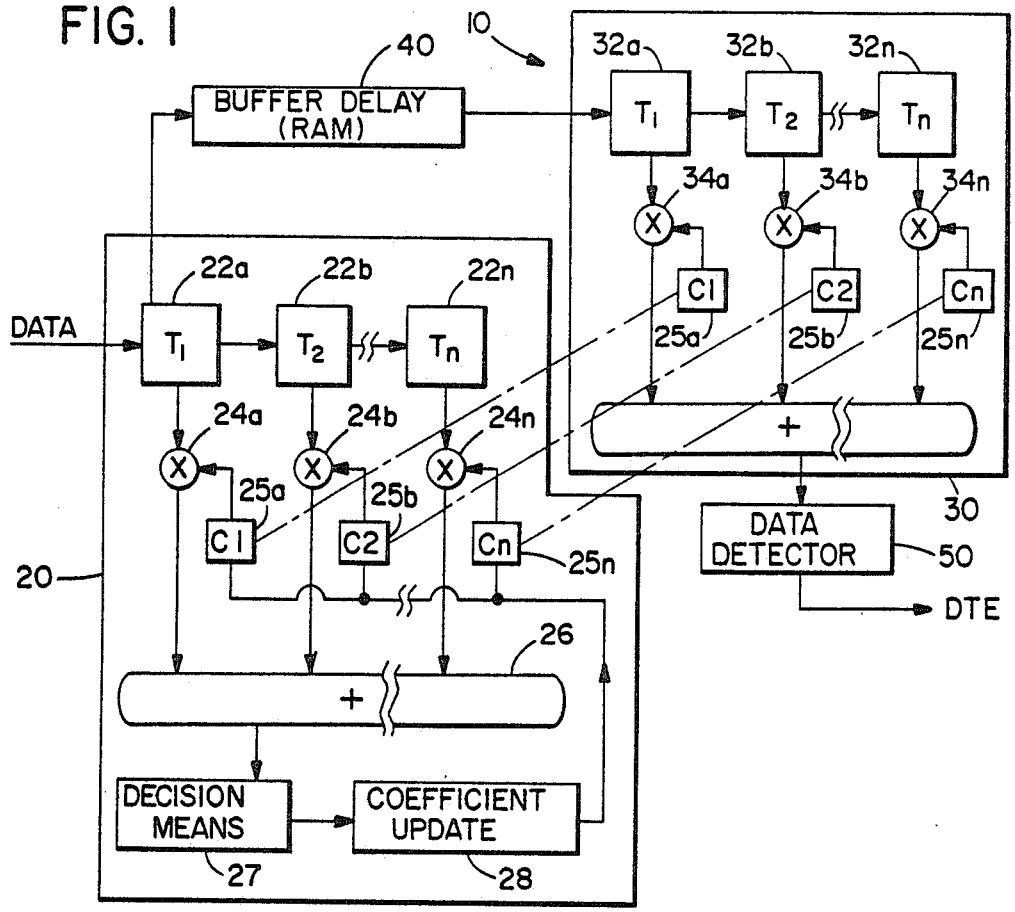
FIG. 1 is a block diagram of the preferred embodiment of the equalizer of the invention.

Turning to FIG. 1, the preferred embodiment of the modem equalizer which minimizes equalizer delay is seen. The modem equalizer 10 preferably includes two impulse response means 20 and 30, a buffer delay means 40, and a data decision means 50. Both impulse response means are preferably finite impulse response filters (FIRs), although other filters such as an infinite impulse response filter (IIR) might be used. Regardless, the impulse response means 20 preferably includes a plurality of taps $22a, 22b \ldots 22n$ for storing values of the incoming signal over time, a plurality of tap gain means $24a, 24b \ldots 24n$ for multiplying the tapped signals with equalizer coefficients $25a, 25b \ldots 25n$, a summing means 26 for summing the products of the plurality of tap gain means $24a, 24b \ldots 24n$ and producing a processed output signal therefrom, a decision means 27 for determining whether the equalizer coefficients 25 are sufficiently adapted to allow substantially error free transmission, and an equalization means 28 for comparing the output to an ideal value, for changing the equalizer coefficients accordingly. For purposes herein it will be understood that while substantially error free transmission would typically imply the meeting of particular standards such as a desired bit error ratio (BER) or block error ratio (BLER), different manufacturers might consider different error rates as "substantially error free transmission". Thus, what is intended herein by such terminology is the level of error tolerated by a manufacturer before communication would be discontinued or not allowed.

The second impulse response means 30 is of similar structure to impulse response means 20 and preferably includes taps $32a, 32b \ldots 32n$, tap gain means $34a, 34b \ldots 34n$, coefficients $25a, 25b \ldots 25n$, and summation means 36. The function of second impulse response means 30 in the preferred embodiment is to process and pass data as opposed to the function of the first impulse response means 20 which is to adapt the coefficients. The coefficients adapted by FIR 20 are used by FIR 30 to process the data as will be indicated hereinafter.

The buffer delay means 40 of the invention is used to create a variable delay; i.e. the delay required for a particular channel. The buffer delay means 40 may be a RAM or an analog delay line. The buffer 30 preferably starts receiving communications data after the completion of the training sequence but before the equalizer coefficients of the FIR 20 have sufficiently adapted to allow substantially error free transmission. Thus, the length of the buffer (i.e. the variable delay of the data) is determined by the time it takes FIR 20 to sufficiently adapt (i.e. converge). As will be discussed hereinafter, where the data channel is optimal (i.e. minimal amplitude and phase delay distortion conditions), at the end of the minimal duration training sequence the FIR will have already converged and hence the buffer 40 will not be utilized (i.e. buffer of zero length). However, in other cases where the channel is not optimal, after the minimal duration training sequence, the FIR will still not have sufficiently adapted to allow substantially error free transmission. In these cases, the data which is being communicated is sent both the FIR 20 so that additional coefficient adaptation can occur in the equalizer and to the buffer 40 so that the data will not be lost. Upon satisfactory equalization, the buffer 40 sends the stored data to the second FIR 30 so that FIR 30 can process the data and pass the data to data decision means 50 where a decision can be made from the processed data sample as to what data value was originally communicated over the channel.

Before turning to the provided alternative embodiments, a discussion of the operation of the equalizer of FIG. 1 is warranted. As indicated in the Background section herein, the modems of the prior art have a fixed RTS-CTS (request to send—clear to send) delay which is determined by the requirements imposed by the worst case unconditional line that the modem might encounter. Thus, the provided training sequence is a training sequence which ostensibly permits the modem to equalize in the worst case conditions. Of course, if the line (channel) conditions are worse than the expected worse case, data will be sent after the fixed delay regardless of whether the equalizer has converged. Also, if the channel conditions are much better than the worst case such that equalizer convergence is accomplished very quickly, the RTS-CTS delay is still of fixed duration because of the fixed length training sequence. Hence, data communication must wait until the RTS-CTS delay is over.

Figure 2:
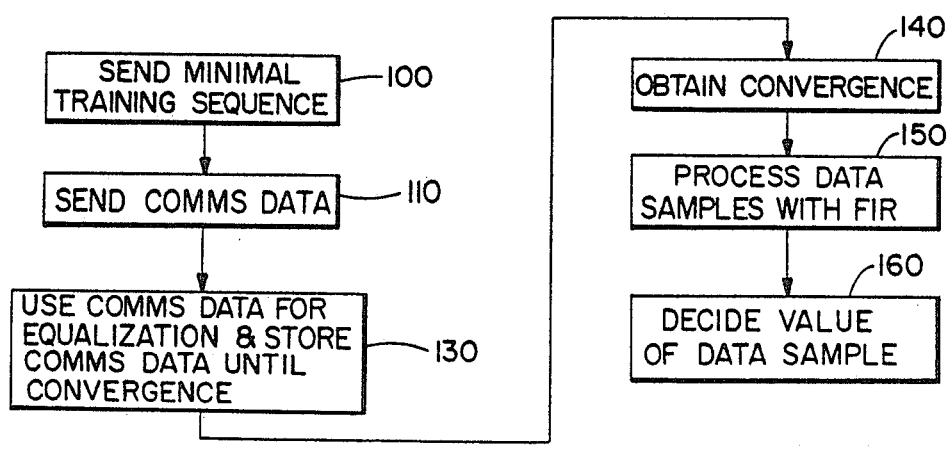
FIG. 2 is a flow chart of the method invention for adaptively minimizing the equalizer delay.

In the operation of the provided equalizer, and in accord with the method invention seen in flow-chart form in FIG. 2, at 100 a training sequence is sent from the remote terminal and is received by the equalizer 10. The training sequence sent to the equalizer is arranged to be minimal; that is, the training sequence is based on the best channel arrangement such that convergence will only be obtained where the training signal is being received over a best case channel (e.g. minimal amplitude and phase delay distortion conditions). The training sequence is received by FIR 20 and is processed according to techniques well known in the art with the equalizer coefficients being iteratively updated. After the training sequence is completed, communications data (the data intended for the data terminal equipment) is sent at 110 regardless of whether the equalizer has sufficiently adapted to permit error free transmission. If the equalizer has not converged (as will be the situation in all but the best channel case) the communications data will be used by the equalizer to further converge but will also be stored at 130 in the buffer means 40 so that none of the data is lost after the data has passed through FIR 20. Additional storage of the data and expansion of the buffer will continue in the buffer means 40 until convergence is obtained at 140, at which time the buffer means 40 will act as a FIFO with new communciations data being sent directly into the buffer means 40 and the first bits of communications data being sent from the buffer means 40 to the taps 32 of FIR 30.

Those skilled in the art will appreciate that the transfer of data from the buffer 40 to the second FIR 30 can take various forms. Thus, for example, once the equalizer has converged, a set of samples may be sent in parallel from buffer means 40 to the taps 32a, 32b ... 32n such that tap 32n has the first data sample etc. (in this arrangement it is assumed that tap 32n is the main and final tap). Then, as each data signal is sampled and sent to the FIFO buffer 40, a single sample is sent in a serial manner from FIFO buffer 40 to tap 32a as the other samples shift one tap to the right (i.e. tap 32a to 32b, 32b to 32c ... 32n-1 to 32n). Of course, if tap 32n is not the main tap from which the data is obtained, once the equalizer has converged, the first communications data sample is sent to the appropriate main tap. In that case, to permit proper equalization, all taps after the main tap are preferably sent the last training sequence data samples which preceded the first communications data sample. These last training sequence samples would have had to have been stored in the buffer means 40. Thus, it will be appreciated that an exact determination as to when the buffer means 40 is to start receiving the data signal samples is preferably made according to the nature of the FIR 30. If the last tap of FIR 30 is the main tap, then the buffer means 40 preferably starts accumulating data with the first communications data sample. If the last tap of FIR 30 is not the main tap, then the buffer means 40 preferably accumulates enough training sequence samples to exactly correspond to the number of taps beyond the main tap. In this manner the delay that is incurred is the minimum possible. It will also be appreciated that the first set of data samples could be sent serially to the taps upon convergence rather than in parallel if desired.

Once the data samples are sent to the data taps 32a, 32b ... 32n, they are processed by the FIR 30 at 150 in accord with the equalization coefficients 25a, 25b, 25c ... 25n determined by FIR 20 that had provided the convergence. As additional data samples are obtained, the equalization coefficients 25 of FIR 20 are updated and used by FIR 30 to process the data. The processed data is then sent to the decision means 50 where a decision is made at 160 according to well known techniques as to the value of the data that was originally sent.

Figure 3:
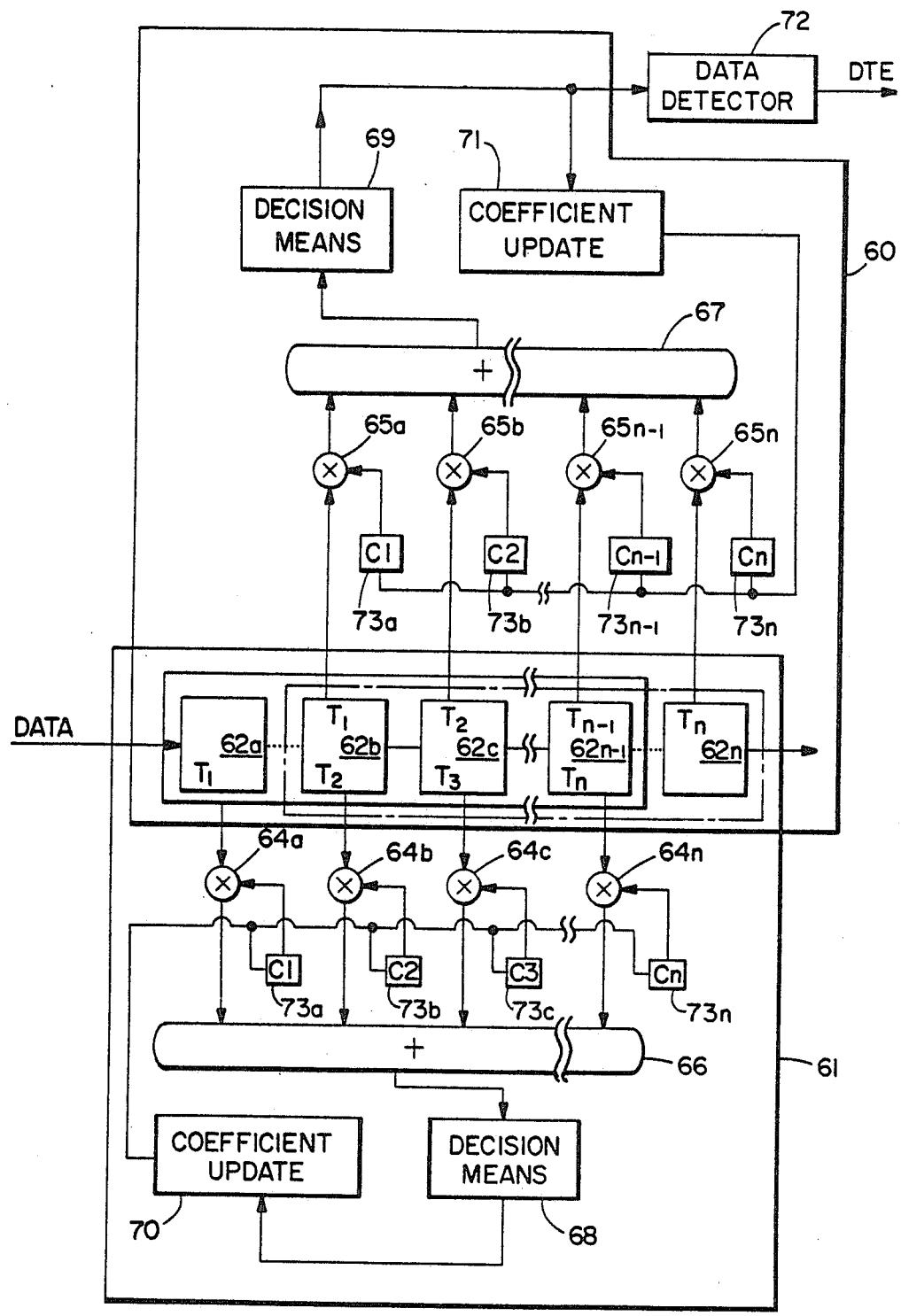
FIG. 3 is a block diagram of a double tap update embodiment of the equalizer of the invention.

Turning to FIG. 3, a second embodiment of the equalizer invention is seen. The equalizer of FIG. 3 basically includes two finite impulse response means 60 and 61 which may share a plurality of taps 62a, 62b, ..., and a plurality of coefficients 73a, 73b, ..., and which each have a plurality of tap gain means 64a, 64b, ..., 65a, 65b ..., a summing means 66 and 67, decision means 68 and 69, and equalization means 70 and 71. With the provided shared tap arrangement, it will be appreciated that a double coefficient update per baud time may be accomplished, where equalization means 71 sees the same data as equalization means 70 but uses a better set of coefficients, as the set of coefficients 73a, 73b ... 73n are a shared set of coefficients. Thus, both equalization means benefit from the other's adaptations, as after the second equalization means further refines the coefficients, the first equalization means uses the further refined coefficients for the next data sample.

If error free transmission can not accomplished after the training sequence has been completed, the second equalizer slides with time to retain the last samples of the training sequence and/or the first samples of the data. When the two equalizers disconnect, a buffer (not shown) must be placed between the two to absorb the delay. Once convergence is reached, the second FIR 60 will stop sliding and send its decisions via decision means 69 to the data decision means 72 where a decision is made as to what data value was originally communicated over the channel.

It will be appreciated that with the provided arrangement of FIG. 3, the sliding of the data taps with respect to each other can occur at any time during the receiving of the training sequence or "communication" data rather than necessarily with the last samples of the training sequence. Moreover, the data taps need not slide at any fixed rate as they may maintain a fixed relative position to one another. Further, it will be understood that a buffer may be placed between the two FIRs when they disconnect and/or at the end of the second FIR. If a buffer is placed at the end of the second FIR, the data in the buffer must be processed by the second FIR upon convergence.

Figure 4:
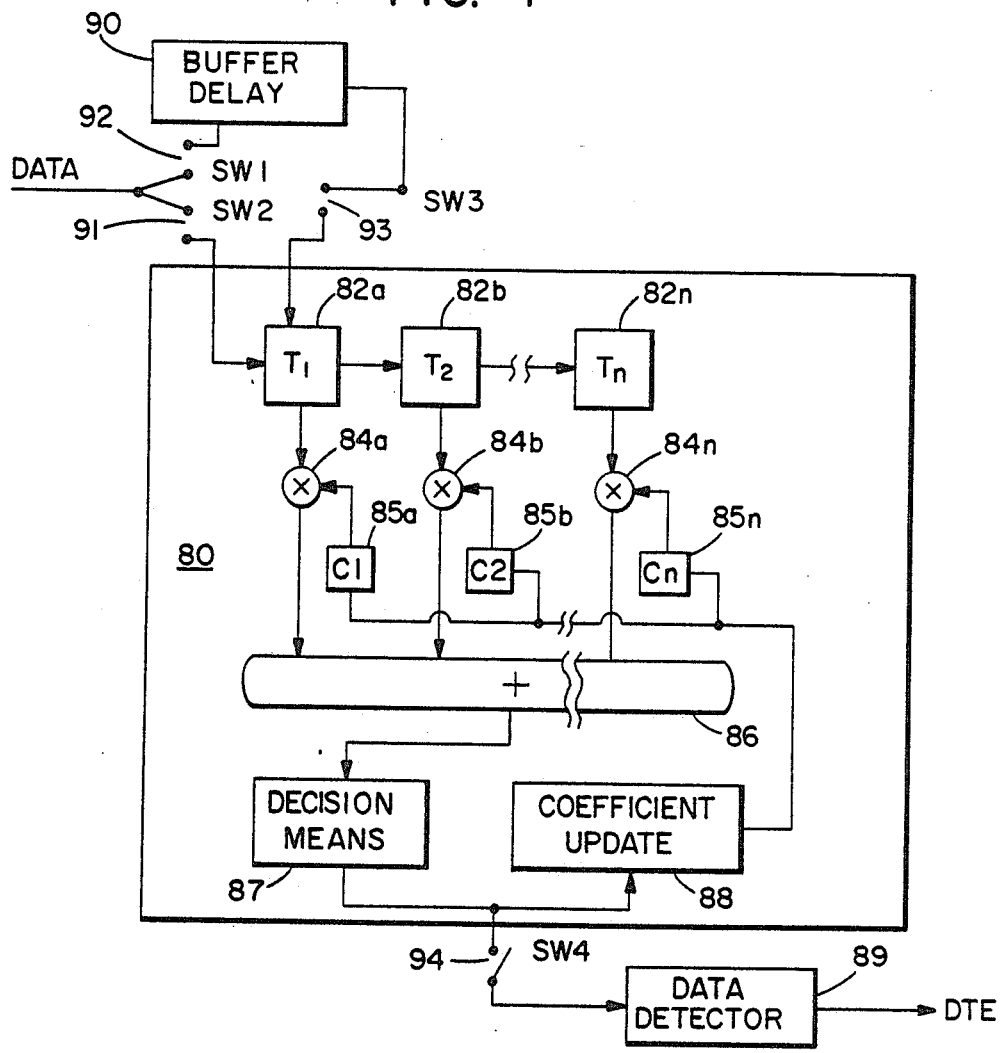
FIG. 4 is a block diagram of a single filter embodiment of the equalizer of the invention.
Figure 5:
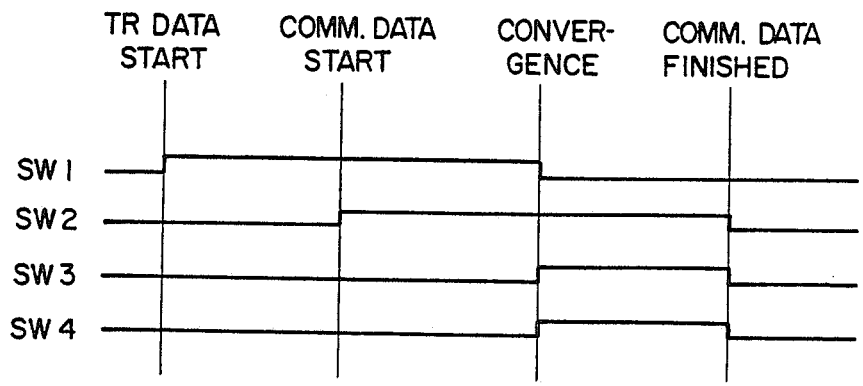
FIG. 5 is a timing diagram for the switches of the equalizer of FIG. 4.

Turning to FIGS. 4 and 5, yet another embodiment of the invention is seen, where only a single FIR filter 80 is utilized to accomplish both the adaptation of the coefficients and the processing and passing of data. However, with the arrangement of FIG. 4, the adaptation of the coefficients and the processing of the data are removed in time through the use of switches and a buffer means 90. Thus, the FIR filter 80 includes a plurality of taps 82a, 82b ..., a plurality of tap gain means 84a, 84b ..., a plurality of adaptable coefficients 85a, 85b ..., a summing means 86, and an equalization means 88 which perform the functions as aforedescribed with respect to FIG. 1. When the training sequence starts, switch 91 is closed and the training data is forwarded through switch 91 to the FIR filter 80 where samples are taken at the taps 82, the samples are multiplied by the equalizer coefficients 85 at tap gain means 84, the products are summed at summing means 86, a decision as to the ideal data value is made at decision means 87 and the equalizer coefficients are updated via coefficient update 88. At the end of the training sequence, if the equalizer has not converged, switch 92 is closed and the communications data starts to flow both into taps 82 and the buffer delay means 90. The communications data samples are processed by the FIR filter 80 until convergence is reached and data may be passed substantially error free. At that time, switch 91 is opened, and switch 93 is closed. Switch 94 may also be closed at that time if the first tap of FIR 80 is the main tap or if enough communication data samples are sent in parallel such that the main tap receives the first communication data sample. Otherwise, switch 94 is closed when the first communications data reaches the main tap. The data path resulting from the switching is that the communications data is sent directly to FIFO buffer 90 which sends the first communications data sample received when switch 92 was closed through closed switch 93 to the taps 82. Based on the determined coefficients, the information in the main tap is processed, and a decision as to the ideal data value is made at decision means 87. The determined value is then sent via switch 94 to the data detector 89 which processes the ideal value and sends the data to the data terminal equipment (DTE).

It will be appreciated that as with the equalizer of FIG. 1, in the equalizer of FIG. 4, the exact manner in which the original transfer of data is made from the buffer 90 to the taps 82 upon convergence is a matter of choice (e.g. in parallel or serial). Also, the locations into which the buffer data is originally transferred to the taps will depend on the taps themselves. Likewise, if desired, switch 92 may be closed slightly before the end of the training sequence such that the last few samples of the training sequence can be stored to permit proper determinations upon convergence and the sending of the communications data to the FIR.

There has been described and illustrated herein an apparatus and method for adaptively optimizing equalization delay of a modem. While particular embodiments of the invention have been described, it is not intended that the invention be limited thereby, as it is intended that the invention be broad in scope and that the specifications be read likewise. Thus, those skilled in the art will appreciate that a plethora of changes could be made to the details of the equalizers without deviating from the invention. For example, while the details of the provided embodiments were arranged such that the total RTS-CTS delay was the absolute minimum possible, it will be recognized that by timing the data into and out of the buffer differently, or by permitting the training sequence to be longer than the sequence required for an optimal channel, a system which provides advantages over the prior art but does not provide an absolute minimal RTS-CTS delay could be provided. Likewise, it will be recognized that the buffer delay means could be placed at one of many different desired locations along the data taps of either the single or double FIR embodiment. For example, instead of sending information into the buffer delay means coincidentally with sending communications data into the first tap of the FIR, the buffer delay means could be located at the output of the FIR (i.e. at the last tap). In this manner the taps could be thought as being an extension of the buffer delay means such that even if convergence does not occur before communications data is received by the taps, it might occur before the first data sample leaves the taps. Thus, in the case of a nearly optimal channel, the delay part of this "extended" delay buffer means might not get utilized. Or, if desired, the buffer delay means could be placed at the main tap location. Indeed, it will be further be appreciated that rather than utilizing training sequence data of a length dictated by a best-case channel, no training sequence need be utilized at all. Without a training sequence, the equalizer of the invention would use the real "communications" data as the data on which to train its equalizer coefficients. The communications data would simultaneously be stored in the buffer delay means until the coefficients were sufficiently adapted.

Further yet, it should be appreciated that a "buffer delay means" is broad terminology intended to encompass a storage means for delaying data for a previously undetermined duration. A RAM or an analog delay line are two means of accomplishing the same. Similarly, various equivalents of other of the components of the disclosed modem equalizer may be utilized. For example, the coefficient update means could be a processing means for correlating, averaging and adjusting, or an FFT means. Therefore, it will be apparent to those skilled in the art that other changes and modifications may be made to the invention as described without departing from the spirit and scope of the invention as so claimed.

I claim:

1. A data communication equipment equalizer which is arranged to receive and process data which has been sent over and distorted by a channel, said equalizer comprising:
   (a) a first impulse response means having a coefficient update means, wherein said first impulse response means is arranged to obtain at least a first group of said data, and to adapt equalizer coefficients of said coefficient update means based on said at least first group of obtained data at least until said equalizer coefficients are sufficiently adapted to allow substantially error free data transmission;
   (b) a buffer delay means for receiving at least a second group of said data and for delaying at least said second group data until said equalizer coefficients of said first impulse response means have been sufficiently adapted to allow substantially error free transmission of at least said second group data, and for providing delayed data, after said equalizer coefficients are sufficiently adapted to allow substantially error free transmission, to an impulse response means which processes at least said delayed second group data according to said adapted equalizer coefficents and provides therefrom processed data samples; and
   (c) data detector means for receiving said processed data samples and determining what data values to assign to said processed data samples.

2. A data communication equipment equalizer according to claim 1, wherein:
   said first group datfa comprises training sequence data followed by communication data, and said second group data comprises at least said communication data, such that said first and second groups at least partially intersect,
   said training sequence data comprises a substantially minimal training sequence based on a low distortion channel,
   said buffer delay means receives at least said communications data transmitted after completion of said minimal training sequence and before said equalizer coefficients have sufficiently adapted, and
   a total training time delay of said equalizer for said channel is substantially minimized and comprises a delay due to said substantially minimal training sequence, plus a delay necessary for said channel to permit said equalizer coefficients to sufficiently adapt.

3. A data communication equipment equalizer according to claim 2, wherein:
all said communications data is maintained as said buffer means stores said communications data while said equalization means uses said communications data to continue to adapt said equalizer coefficients.

4. A data communication equipment equalizer according to claim 1, wherein:
said first impulse response means further comprises
(1) a plurality of data tap means for storing samples of at least said first group data over time,
(2) a plurality of tap gain means which multiply a plurality of said equalizer coefficients with said stored as least first group data samples to obtain a plurality of products,
(3) a summing means for summing said products and producing an output therefrom, and
(4) said coefficient update means for comparing said output to an ideal value, for changing said equalizer coefficients accordingly, and for determining whether said equalizer coefficients are sufficiently adapted to allow substantially error free transmission.

5. A data communication equipment equalizer according to claim 4, wherein:
upon equalizer coefficients being sufficiently adapted to allow substantially error free transmission, said buffer means is arranged to provide a predetermined plurality of at least second group data samples to a predetermined number of said plurality of tap means during one cycle, and thereafter to provide one said second group data sample per cycle to one of said plurality of tap means.

6. A data communication equipment equalizer according to claim 4, further comprising:
(d) a plurality of switching means for controlling flow of said data into, through, and out of said equalizer, at least one of said plurality of switching means coupled to said channel.

7. A data communication equipment equalizer according to claim 6, wherein:
said impulse response means which processes said at least second group delayed data is said first impulse response means, and
said plurality of switching means comprises a first switching means for connecting said channel directly to said buffer delay means, a second switching means for disconnecting said channel from at least one of said plurality of data tap means to which it may be connected, a third switching means for connecting an output of said buffer delay means with at least one of said plurality of data tap means once said equalizer coefficients are sufficiently adapted to allow substantially error free data transmission, and a fourth switching means for connecting an output of said data detector means to a data terminal equipment.

8. A data communication equipment equalizer according to claim 4, wherein:
said impulse response means is a finite impulse response filter, and said buffer delay means comprises a RAM.

9. A data communiction equipment equalizer according to claim 1, further comprising:
(d) a second impulse response means comprising said impulse response means which processes said at least second group delayed data according to said adapted equalizer coefficients determined by said first impulse response means, wherein said coefficient update means to which said second group delayed data is provided by said buffer delay means is said second impulse response means.

10. A data communication equipment equalizer which is arranged to receive and process data which has been sent over and distorted by a channel, said equalizer comprising:
(a) a first impulse response means having a coefficient update means, wherein said first impulse response means is arranged to obtain at least a first group of said data, and to adapt equalizer coefficients of said coefficient update means based on at least said first group of obtained data;
(b) a buffer delay means for receiving at least a second group of said data, and for delaying at least said second group data until said equalizer coefficients of said first impulse response means have been sufficiently adapted to allow substantially error free transmission of at least said second group data,
(c) a second impulse response means for receiving at least said second group delayed data from said buffer delay means after said equalizer coefficients of said first impulse response means are sufficiently adapted to allow substantially error free transmission, said second impulse response means comprising at least a processing means for processing at least said second group data according to said adapted equalizer coefficients to provide processed data samples, wherein at least one of said first and second impulse response means includes means for determining whether said equalizer coefficients are sufficiently adapted to allow substantially error free transmission; and
(d) data detector means for determining what data values to assign said processed data samples.

11. A data communication equipment equalizer according to claim 10, wherein:
said first and second impulse response means are finite impulse response filters, and said second finite impulse response filter is coupled to an output of said buffer delay means to receive said at least second group data and to process said second group data with said equalizer coefficients determined by said coefficient update means of said first finite impulse response filter.

12. A data communication equipment equalizer according to claim 11, wherein:
said data detector means of said equalizer is coupled to an output of said second finite impulse response filter such that determined data values may be sent to a desired data terminal equipment.

13. A data communication equipment equalizer according to claim 10, wherein:
said first impulse response means comprises:
(1) a plurality of data tap means for storing samples of at least said first group data over time,
(2) a plurality of tap gain means which multiply a plurality of said equalizer coefficients with said stored at least first group data samples to obtain a plurality of products, (3) a summing means for summing said products and producing an output therefrom, and (4) said coefficient update means for comparing said output to an ideal value, and for changing said equalizer coefficients accordingly.

14. A data communication equipment equalizer according to claim 13, wherein:

said second impulse response means further comprises, a plurality of second tap means for storing samples of at least said first group data over time, a plurality of second tap gain means for multiplying second equalizer coefficients with said at least first group data samples to produce a second plurality of products, a second summing means for summing said second plurality of products and producing a second output therefrom, and second coefficient update means for comparing said second output to said ideal value, for changing said second equalizer coefficients accordingly, and for determining whether said second equalizer coefficients are sufficiently adapted to allow substantially error free transmission wherein said adapted equalizer coefficients of a first of said first and second impulse response means are available to the other of said first and second impulse response means.

15. A data communication equipment equalizer according to claim 11, wherein:

said first group data comprises training sequence data followed by communication data, and said second group data comprises at least said communication data, such that said first and second groups at least partially intersect, said training sequence data comprises a substantially minimal training sequence based on a low distortion channel, said buffer delay means receives at least said communications data transmitted after completion of said minimal training sequence and before said equalizer coefficients have sufficiently adapted, and a total training time delay of said equalizer for said channel is substantially minimized and comprises a delay due to said substantially minimal training sequence, plus a delay necessary for said channel to permit said equalizer coefficients to sufficiently adapt.

16. A data communication equipment equalizer according to claim 15, wherein:

all said communications data is maintained as said buffer delay means stores said communications data while said equalization means uses said communications data to continue to adapt said equalizer coefficients.

17. A data communication equipment equalizer according to claim 14, wherein:

upon said equalizer coefficients being sufficiently adapted to allow substantially error free transmission, said buffer delay means is arranged to provide a predetermined plurality of said second group data samples to a predetermined number of said plurality of second tap means during one cycle, and thereafter to provide one said second group data sample per cycle to one of said plurality of second tap means.

18. A data communication equipment equalizer according to claim 14, wherein:

upon equalizer coefficients being sufficiently adapted to allow substantially error free transmission, said buffer delay means is arranged to provide one said second group data sample per cycle to one of said plurality of second tap means.

19. A method for adaptively optimizing equalization delay in an equalizer of a modem provided with at least an impulse response means having a coefficient update means with equalizer coefficients, and a buffer delay means, comprising:

(a) sending data over said channel to said modem;

(b) using at least a first group of said data to adapt said equalizer coefficients;

(c) storing at least a second group of said data in a buffer delay means while said at least first group data is being used to adapt said equalizer coefficients;

(d) upon said equalizer coefficients being sufficiently adapted to allow substantially error free transmission, processing in an equalizer having said adapted coefficients at least said second group of data stored in said buffer delay means and providing therefrom processed data samples; and (e) from said processed data samples, determining what data values were sent over said channel.

20. A method according to claim 19, wherein:

said first group of data uses at least training sequence data of substantially minimal length and communications data, and said step of storing said second group of data uses at least said communications data, said first and second groups of data at least partially intersecting wherein said minimal length is defined by a length of time required to permit said equalizer of said modem to adapt said equalizer coefficients so as to allow substantially error free data transmission given a low distortion channel, and said second group data stored in said buffer delay means comprises at least communications data received while said equalizer coefficients are being adapted, wherein at least samples of said communications data are used to adapt said equalizer coefficients.

* * * * *